(12) United States Patent
Lin et al.

(10) Patent No.: US 7,336,248 B2
(45) Date of Patent: Feb. 26, 2008

(54) DISPLAY DEVICE AND DRIVING METHOD THEREOF

(75) Inventors: Ming-Tien Lin, Lujou (TW); Yi-Lun Chou, Taipei (TW); Tean-Sen Jen, Pingjhen (TW)

(73) Assignee: Hannstar Display Corporation, Taipei (TW)

( * ) Notice: Subject to any disclaimer, the term of this patent is extended or adjusted under 35 U.S.C. 154(b) by 718 days.

(21) Appl. No.: 10/838,496

(22) Filed: May 3, 2004

(65) Prior Publication Data
US 2005/0052382 A1 Mar. 10, 2005

(30) Foreign Application Priority Data
Aug. 20, 2003 (TW) .............................. 92122839 A

(51) Int. Cl.
G09G 3/36 (2006.01)
(52) U.S. Cl. .............................. 345/87; 345/92; 345/93; 345/95; 345/99
(58) Field of Classification Search .................. 345/87, 345/92, 93, 95, 99
See application file for complete search history.

(56) References Cited

U.S. PATENT DOCUMENTS 7,133,015 B1 * 11/2006 Yoshida et al. ............... 345/99

* cited by examiner

Primary Examiner—Richard Hjerpe
Assistant Examiner—Leonid Shapiro
(74) Attorney, Agent, or Firm—Egbert Law Offices

(57) ABSTRACT

A liquid crystal display is suitable for displaying images with rapid motions, and comprises an active matrix substrate equipped with a plurality of thin film transistors. The active matrix substrate comprises a plurality of pixels that are placed at the encircled areas of a plurality of scanning lines and a plurality of data lines. Each pixel consists of two thin film transistors and one pixel electrode. The data lines connected electrodes of the thin film transistors are connected to two adjoining data lines respectively, whereas the pixel connected electrodes of the two thin film transistors are together connected to the pixel electrode. The gate electrodes of the two thin film transistors are connected to two adjoining scanning lines respectively.

27 Claims, 9 Drawing Sheets

DISPLAY DEVICE AND DRIVING METHOD THEREOF

BACKGROUND OF THE INVENTION

1. Field of the Invention

The present invention relates to a display, such as a liquid crystal display (LCD) panel and more particularly to a display device and a driving method thereof that speeds up optical response and is suitable for displaying continuous images with rapid motions.

2. Description of the Related Art

Progress has been ceaselessly made in the manufacturing technique for liquid crystal displays regarding high contrast displays with a wide view angle. However, continuous images with rapid motions are displayed at the expense of blurred images, as an image change takes place later than variations in motions do. So far various related driving techniques have been put forth in an attempt to shorten the time liquid crystal displays take to respond. Of these, the capacitively coupled driving (CCD) method puts forth by the Japanese Matsushita Electric Industrial Co., Ltd. shortens the time pixel electrodes take to respond to variations in voltage best, and in consequence it speeds up changes in the electric field of a liquid crystal capacitor.

FIG. 1 is an equivalent circuit diagram of a conventional liquid crystal display. The liquid crystal display 10 is composed of a plurality of parallel data lines 121-12$n$ and a plurality of scanning lines 111-11$m$ disposed perpendicular to the data lines, which further comprises a plurality of pixels 13 are placed at the encircled areas of the data lines 121-12$n$ and the scanning lines 111-11$m$. Each pixel 13 comprises a thin film transistor 131 and a liquid crystal capacitor 133, which control the direction in which liquid crystal molecules tilt. For instance, the thin film transistor 131 is controlled by a pulse $\Phi_2$ of the scanning line 112 to be turned on or turned off, whereas the two electrodes of the liquid crystal capacitor 133 are connected to a pixel electrode 134 and a common electrode 135, respectively. In addition, each of the pixels 13 comprises a storage capacitor 132 whose two electrodes are connected to the pixel electrode 134 and the scanning 111, respectively. With the storage capacitor 132, the operating voltage of the pixel electrode 134 is kept within a preferred voltage range so as to reduce the leakage resulting from the properties of liquid crystal materials and other stray capacitance.

Furthermore, a coupled voltage is induced on the pixel electrode 134 by employing the scanning signals $\Phi_1$-$\Phi_m$, with four gate voltage levels. Given the coupled voltage, the electric field of the liquid crystal capacitor 133 varies faster. However, real changes of gray levels always occur later than variations in the electric field, as liquid crystal molecules tilt slower than the electric field varies.

FIG. 2($a$) is a conventional waveform diagram of the optical responses of pixels and data signals. The waveforms of the driving voltage applied to a pixel electrode are shown in the lower half of the figure. In the upper half of the figure, the dotted line indicates the theoretical optical responses of pixels, whereas the solid line indicates the actual optical responses of pixels. If a second default voltage $V_1$ applied to the pixel electrode changes into a first default voltage $V_2$, the actual positions or states of the liquid crystal molecules vary and thus the transmittance of rays from a backlight source decreases, compared with the ideal state, which is a true white display without any applied voltage. It takes about two vertical scanning periods to pass through a transient time where transmittance decreases from $L_2$ to $L_1$, thus the conventional technology is unfit for displaying continuous images with rapid motions.

The concept of fast response driving is put forth to speed up optical responses, as shown in FIG. 2($b$). The default voltages $V_2$ and $V_1$ applied to the pixel electrode are replaced with $V_2'$ and $V_1'$, where $V_2<V_2'$ and $|V_1|<|V_1'|$. Hence, the time taken to pass through a transient time in which transmittance decreases from $L_2$ to $L_1$ can be reduced to approximately one vertical scanning period, indicating that the fast response driving method surpasses the driving method described in FIG. 2($a$) in displaying continuous images with rapid motions. Furthermore, the deviation area A' (that is, the hatched area enclosed by the solid line and the dotted line) of the fast response driving method is less than the hatched area A in FIG. 2($a$), thus the fast response driving method seldom brings about blurred motion images.

FIG. 2($c$) is a diagram about the waveforms of the optical responses resulting from the Dynamic Contrast Compensating Driving method put forth by Japanese Hitachi Ltd. Wherein the driving voltages $V_2''>V_2$ and $|V_1''|>|V_1|$, an actual optical response ends up with an overshooting waveform during a vertical scanning period and results in the return of the default transmittance $L_2$ or $L_1$ during the following period. The overshooting-related area B is roughly equal to the area A" so as to compensate for a lack of dynamic contrast in motion images. Nevertheless, it still takes longer time than one vertical scanning period to bring about an overshooting waveform with the dynamic contrast compensating driving method, making it impossible to apply the dynamic contrast compensating driving method to motion images, which take less than 16.7 ms to give an optical response.

SUMMARY OF THE INVENTION

The first objective of the present invention is to provide a liquid crystal display and a driving method for thereof capable of giving fast optical responses, wherein two thin film transistors together function as the switches of each pixel; one of the thin film transistors allows normal driving voltage to a pixel electrode; meanwhile, the other thin film transistor allows overdriving voltage to be applied to the pixel electrode; as a result, the liquid crystal display gives optical responses much sooner.

The second objective of the present invention is to provide a liquid crystal display compatible with existing driving devices, so that the circuit of the liquid crystal display works without any newly developed driving devices.

In order to achieve the aforesaid objectives, the present invention discloses a liquid crystal display that is suitable for displaying images with rapid motions and comprises an active matrix substrate equipped with a plurality of thin film transistors. The active matrix substrate comprises a plurality of pixels that are placed at the encircled areas of a plurality of scanning lines and a plurality of data lines. Each pixel consists of two thin film transistors and one pixel electrode.

The data lines connected electrodes of the thin film transistors are connected to two adjoining data lines respectively, whereas the pixel connected electrodes of the two thin film transistors are together connected to the pixel electrode. The gate electrodes of the two thin film transistors are connected to two adjoining scanning lines respectively.

BRIEF DESCRIPTION OF THE DRAWINGS

The invention will be described according to the appended drawings in which.

PREFERRED EMBODIMENT OF THE PRESENT INVENTION

Figure 3:
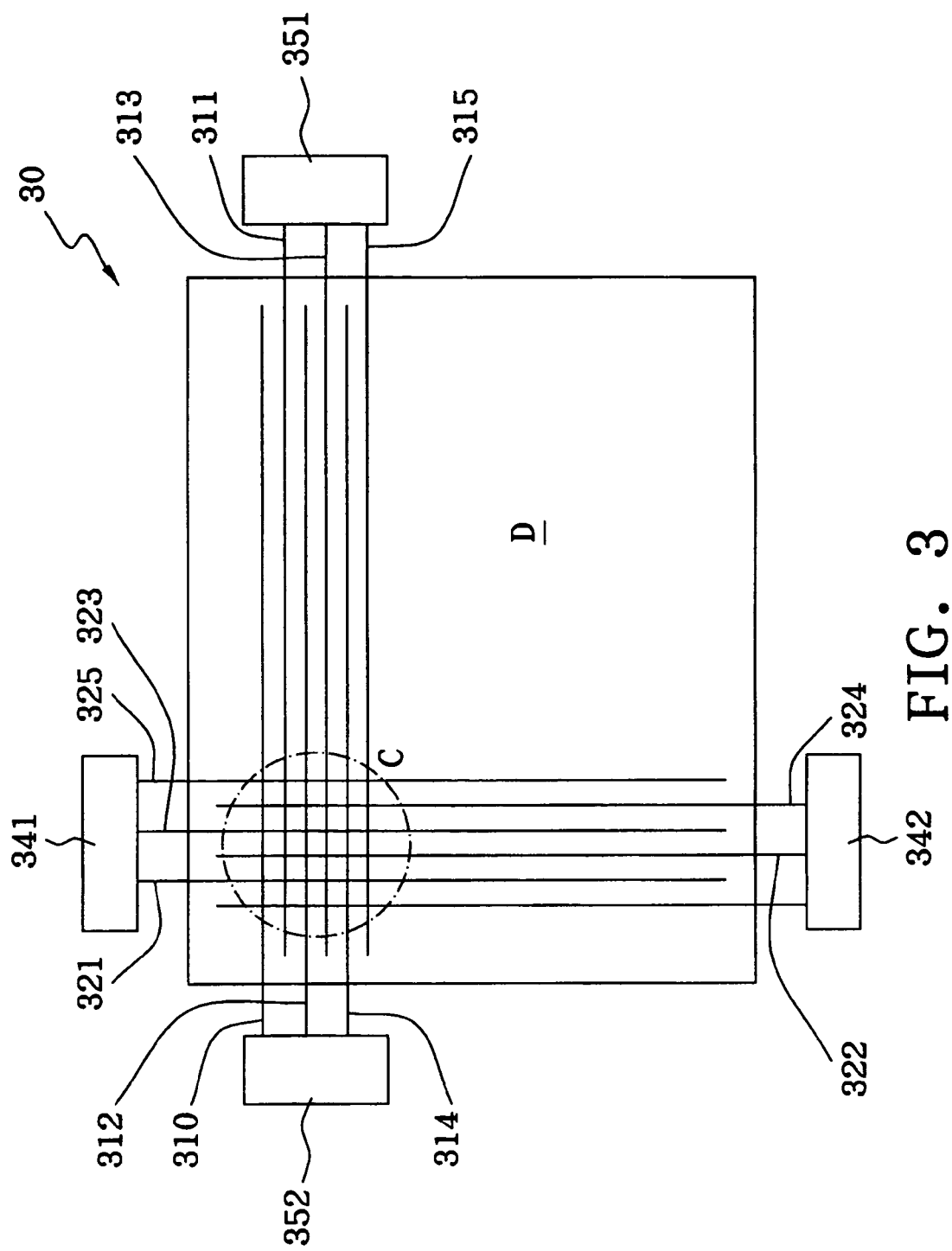
FIG. 3 is a schematic diagram of the circuit layout for the active matrix substrate of the liquid crystal display in accordance with the present invention.

FIG. 3 is a schematic diagram of the circuit layout for the active matrix substrate of the liquid crystal display in accordance with the present invention. The active matrix substrate 30 comprises not only a first data driving device 341 that drives first data lines 321, 323 and 325, but also a second data driving device 342 that controls second data lines 322 and 324. The first data driving device 341 and the second data driving element 342 can be disposed on the two opposite sides of the active area D where the pixels exist. Similarly, a first gate driving device 351 controls first scanning lines 311, 313 and 315, whereas a second gate driving device 352 controls second scanning lines 310, 312 and 314. The first gate driving device 351 and the second gate driving device 352 can be disposed on the two opposite sides of the active area D respectively.

Figure 4:
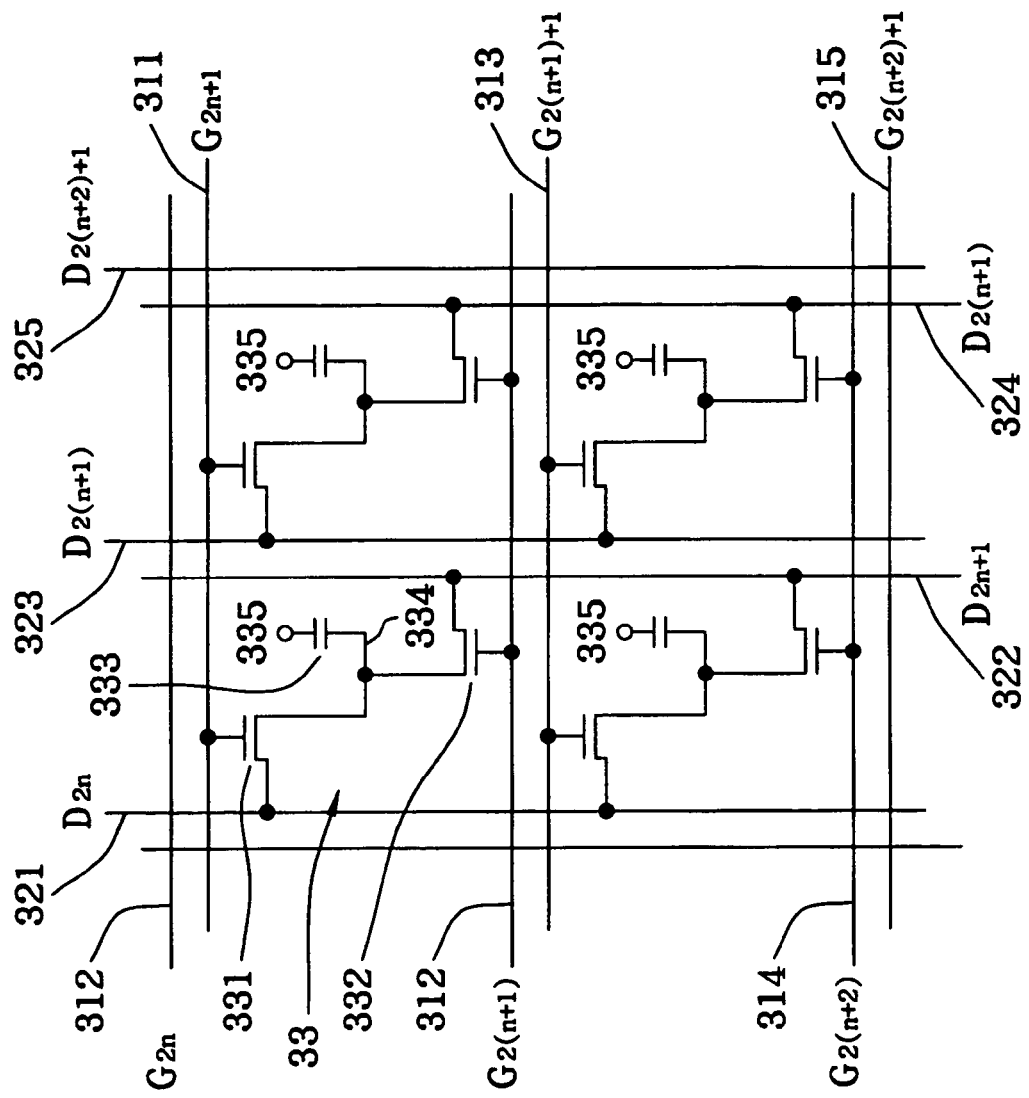
FIG. 4 is a magnification of the circuit layout of portion C in FIG. 3.

FIG. 4 is a magnification of the circuit layout of portion C in FIG. 3. A pixel 33 comprises a first thin film transistor 331 and a second thin film transistor 332, and the two thin film transistors together function as switches, allowing the overdriving signals on the first data line 321 and the data signals on the second data line 322 to be written in a liquid crystal capacitor 333, wherein the first data line 321 is connected to a first electrode of first thin film transistor 331 and a third electrode the second thin film transistor 332 is connected to the second data line 322.

The first gate electrode of the first thin film transistor 331 is controlled by the first scanning line 311, whereas the second gate electrode of the second thin film transistor 332 is controlled by the second scanning line 312. Both the first thin film transistor 331 and the second thin film transistor 332 are connected together to a pixel electrode 334 electrically, wherein the pixel electrode 334 is connected to the second electrode of the first thin film transistor 331 and the fourth electrode of the second thin film transistor 332.

Further, the pixel electrode 334 and a common electrode 335 are the two electrodes of the liquid crystal capacitor 333. Positions or postures of liquid crystal molecules (not shown in the figure) in the liquid crystal capacitor 333 change while the liquid crystal molecules are driven by the electric field of the liquid crystal capacitor 333.

Figure 1:
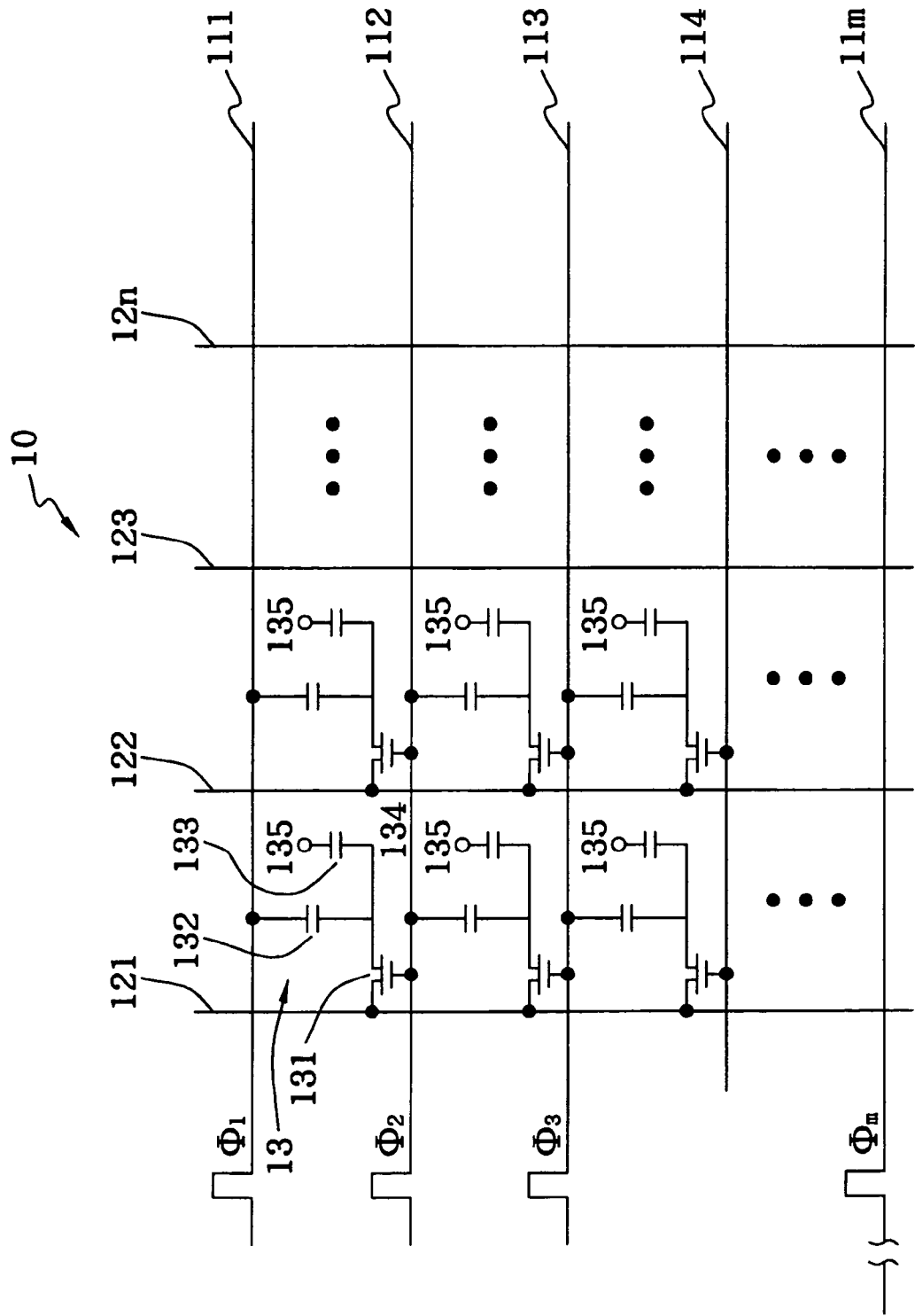
FIG. 1 is an equivalent circuit diagram of a conventional liquid crystal display.
Figure 2A:
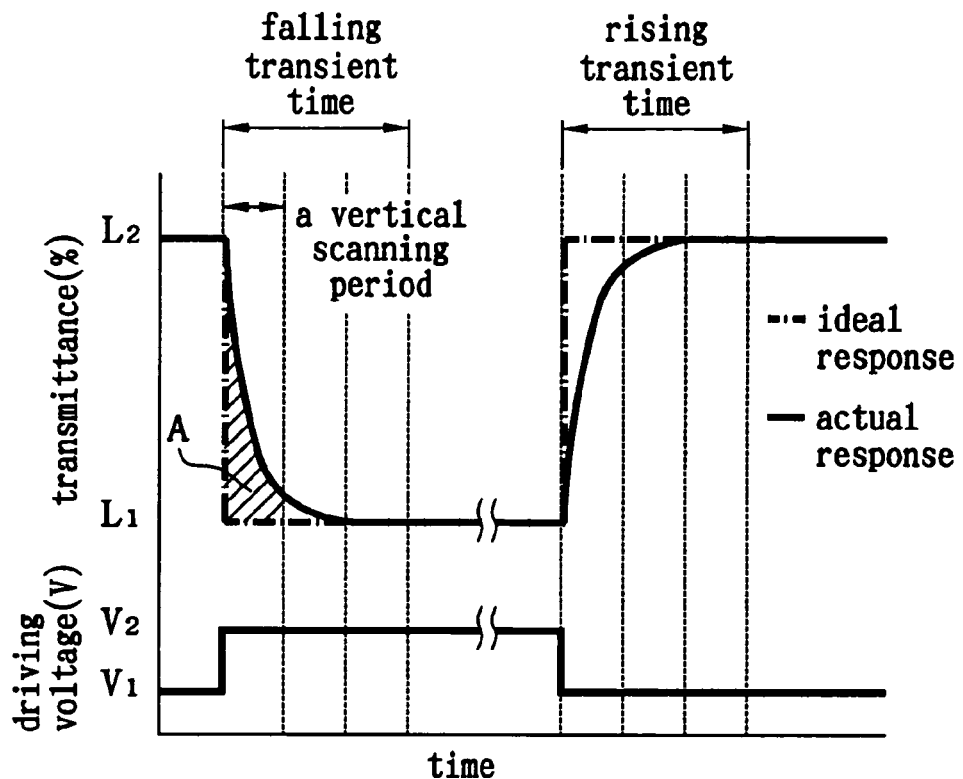
FIGS. 2(a)-2(c) are waveform diagrams of the optical responses of pixels and data signals in accordance with prior arts.
Figure 2B:
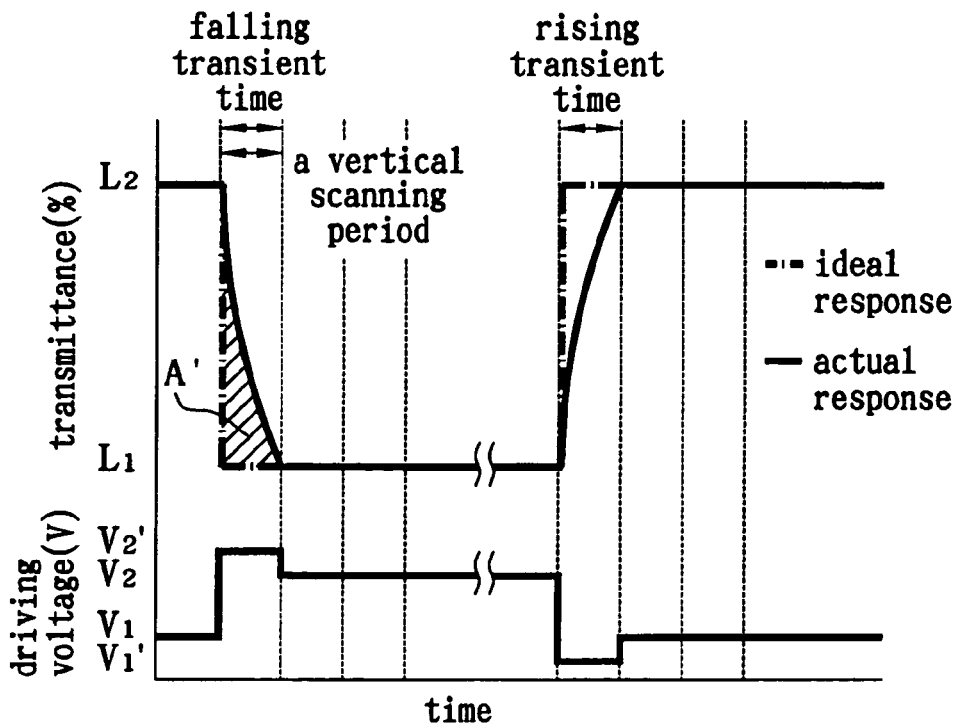
Figure 2C:
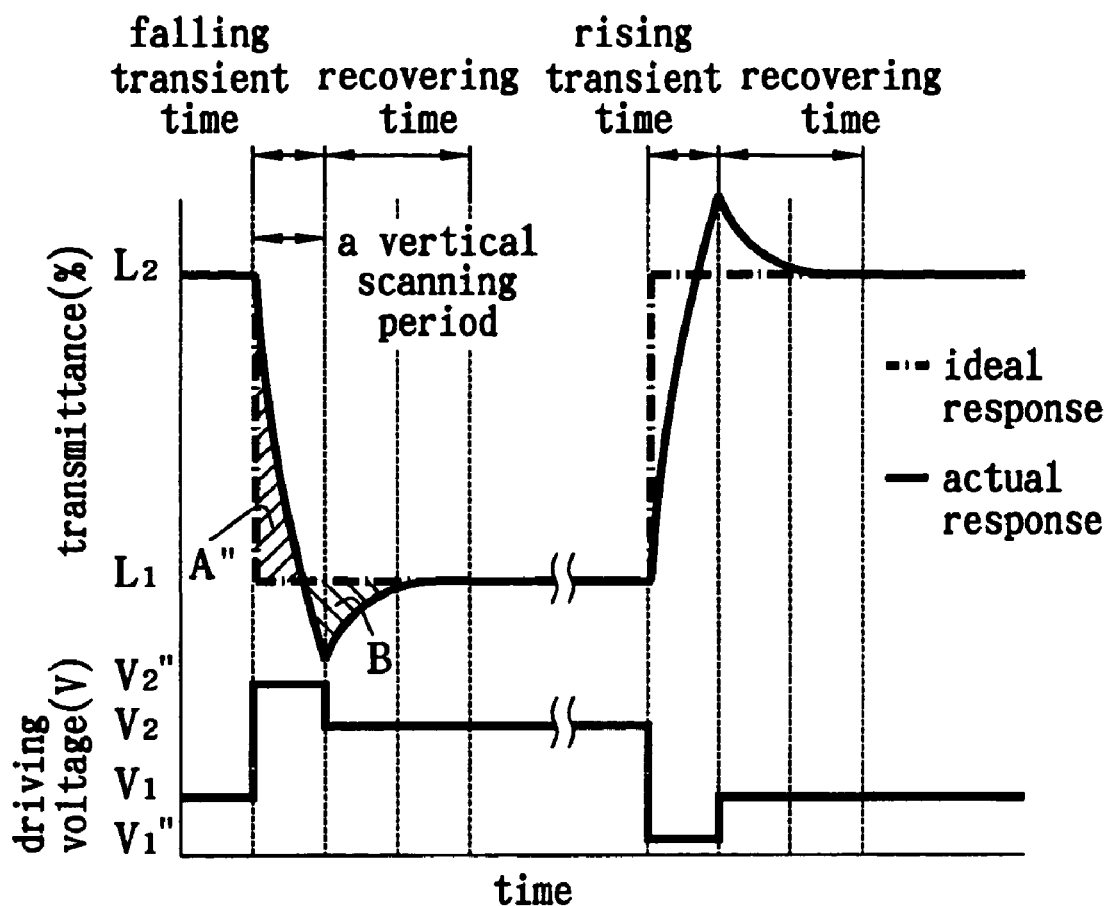
Figure 5:
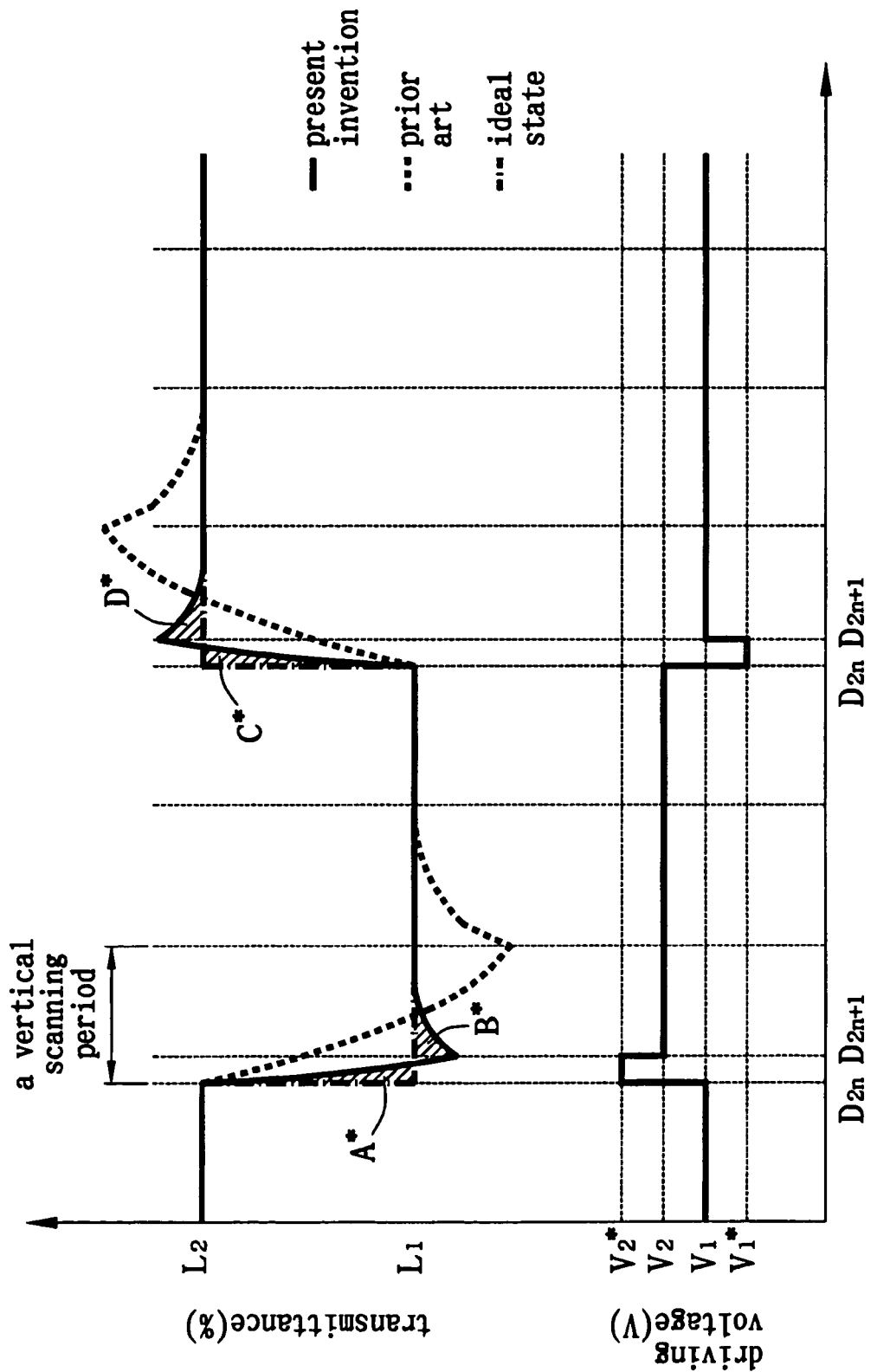
FIG. 5 is a waveform diagram of the optical response of a pixel and a data signal in accordance with the present invention.

As shown in FIG. 5, since the first thin film transistor 331 is solely controlled by the first scanning line 311 to be turned on or turned off and a first overdriving voltage $V_2^*$ ($V_2^* > V_2'' > V_2$) or a second overdriving voltage $V_1^*$ (and $|V_1^*| > |V_1''| > |V_1|$) is applied to the pixel electrode 334, the optical response based on the disclosure of the present invention is superior to the optical response based on conventional technology described in FIG. 2(c). Since the overshooting waveform of the transmittance always recovers the default transmittance $L_1$ during the same period, the merit of the present invention is even more distinct.

The description of a driving method for the present invention needs to refer to FIG. 4 and FIG. 5:

The first overdriving voltage $V_2^*$ is written into the first thin film transistor 331 and the pixel electrode 334 via the first data line 321, and the first default voltage $V_2$ is written into the second thin film transistor 332 and the pixel electrode 334 for a start. Then the second overdriving voltage $V_1^*$ is written into the first thin film transistor 331 and the pixel electrode 334 via the first data line 321, and the second default voltage $V_1$ is written into the second thin film transistor 332 and the pixel electrode 334. The value of suggestion range between the first default voltage $V_2$ and the second default voltage $V_1$ depends on the mode of liquid crystal display. For example, the value of suggestion range for TN mode is 0.5-8.5 Voltages, but for AS-IPS mode is 0.5-15.5 Voltages.

The first overdriving voltage $V_2^*$ is written during a first vertical scanning period, and a first overshooting waveform of transmittance resulting from the first overdriving voltage $V_2^*$ returns to the first default transmittance $L_1$ during the first vertical scanning period. On the other hand, the second overdriving voltage $V_1^*$ is written during a second vertical scanning period, and a second overshooting waveform of transmittance resulting from the second overdriving voltage $V_1^*$ returns to the second default transmittance $L_2$ during the second vertical scanning period.

The difference between the first overdriving voltage $V_2^*$ and first default voltage $V_2$ depends on the first overshooting waveform of transmittance resulting, which further comprises a first hatched area A* and a second hatched area B* are enclosed by the first overshooting waveform of transmittance and a first default waveform of transmittance, and the measure of the first hatched area A* is equal to the measure of the second hatched area B*. Further, the suggestion range of the difference value is 0-0.5 Voltages.

The difference between the second overdriving voltage $V_1^*$ and second default voltage $V_1$ depends on the second overshooting waveform of transmittance resulting, which further comprises a third hatched area C* and a fourth hatched area D* are enclosed by the second overshooting waveform of transmittance and a second default waveform of transmittance, and the measure of the third hatched area C* is equal to the measure of the fourth hatched area D*. Further, the suggestion range of the difference value is 0-0.5 Voltages.

Figure 6:
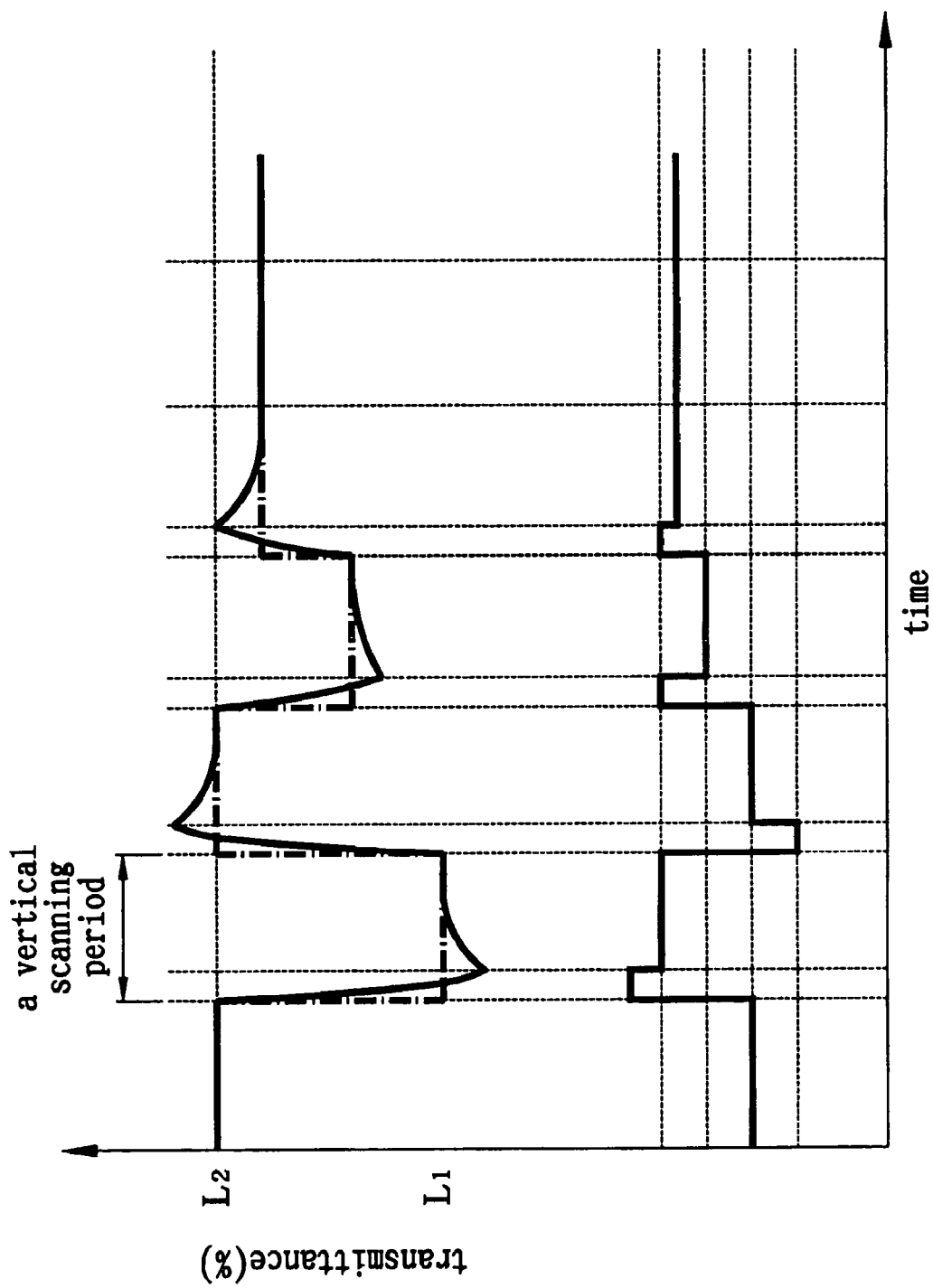
FIG. 6 is a waveform diagram of the optical responses during several consecutive vertical scanning periods in accordance with the present invention.

FIG. 6 is a waveform diagram of the optical responses during several consecutive vertical scanning periods in accordance with the present invention. As illustrated with FIG. 6, in terms of optical response speed and dynamic contrast compensation, the present invention is more suitable for displaying continuous images with rapid motions, as the present invention ensures the recovery of the default transmittance during every vertical scanning period and meets the dynamic contrast compensation requirement. In addition, the circuit layout put forth in accordance with the present invention may be applied to various types of liquid crystal displays, such as twisted nematic (TN), super TN (STN), in-plane switching (IPS), advanced-super IPS (AS-IPS) and multi-domain vertical alignment (MVA). The present invention is also applied to liquid crystal displays characterized by a high aperture ratio (HAR) technology or a color filter on array (COA) technology.

Figure 7:
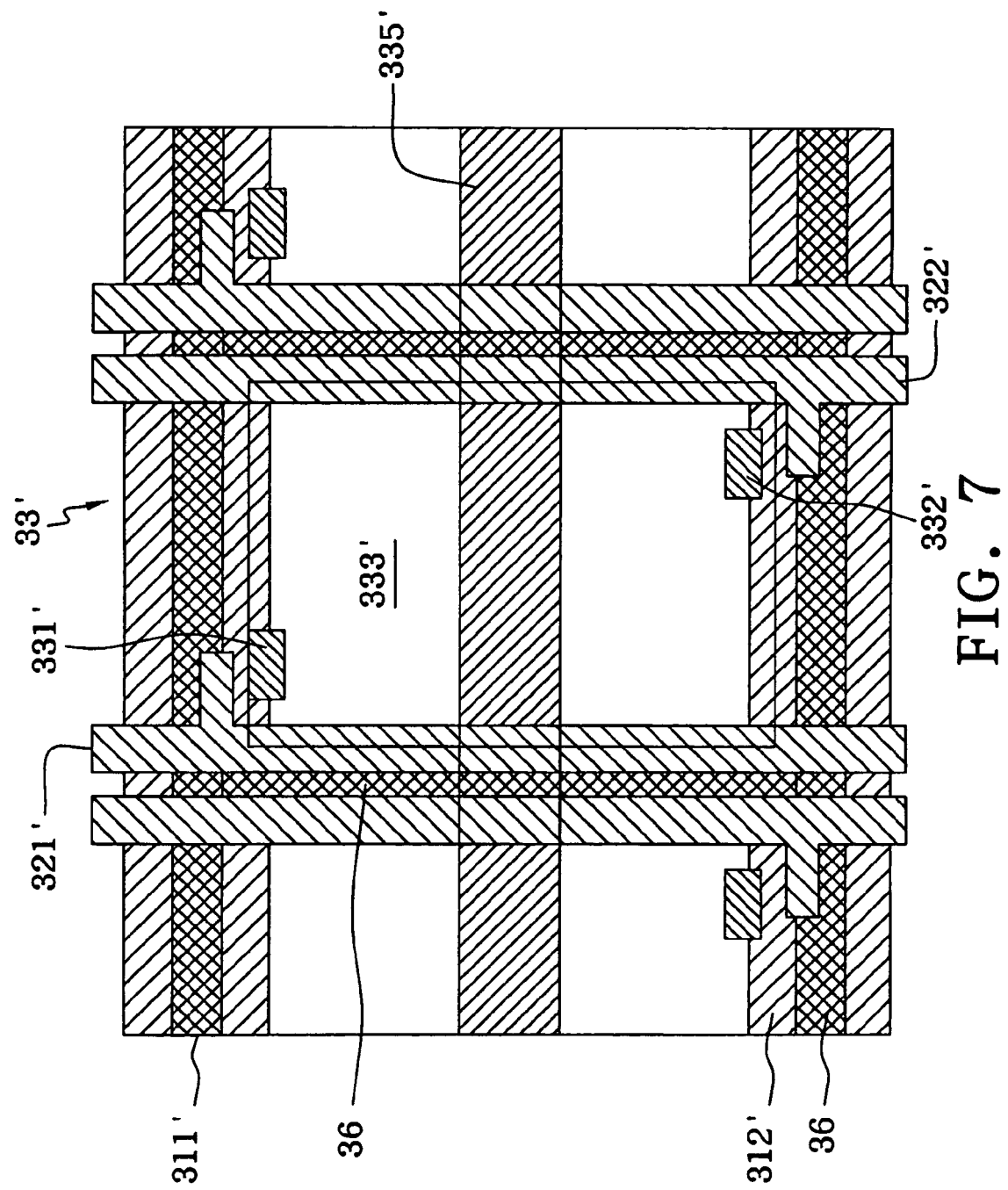
FIG. 7 is a schematic diagram of the circuit layout of the pixel applied to an active matrix substrate employing the color filter on array technology in accordance with the present invention.

FIG. 7 is a schematic diagram of the circuit layout of the pixel applied to an active matrix substrate employing the color filter on array technology in accordance with the present invention. In this embodiment, a first thin film transistor 331' and a second thin film transistor 332' are disposed at two diagonal corners of a pixel 33', respectively. The first gate electrode of the first thin film transistor 331' is connected to a first scanning line 311', whereas its two other electrodes are connected to a first data line 321' and a pixel electrode 333' respectively. The second gate electrode of the second thin film transistor 332' is connected to a second scanning line 312', whereas its two other electrodes are connected to a second data line 322' and the pixel electrode 333' respectively. An in-plane or horizontal electric field exists between a common electrode 335' and the pixel electrode 333' to drive liquid crystal molecules to rotate for an optical response. An opaque black matrix 36 which functions as a partition is disposed at the periphery of the pixel 33' in order to prevent light rays from be leaked through the edge of the pixel 33'.

Figure 8:
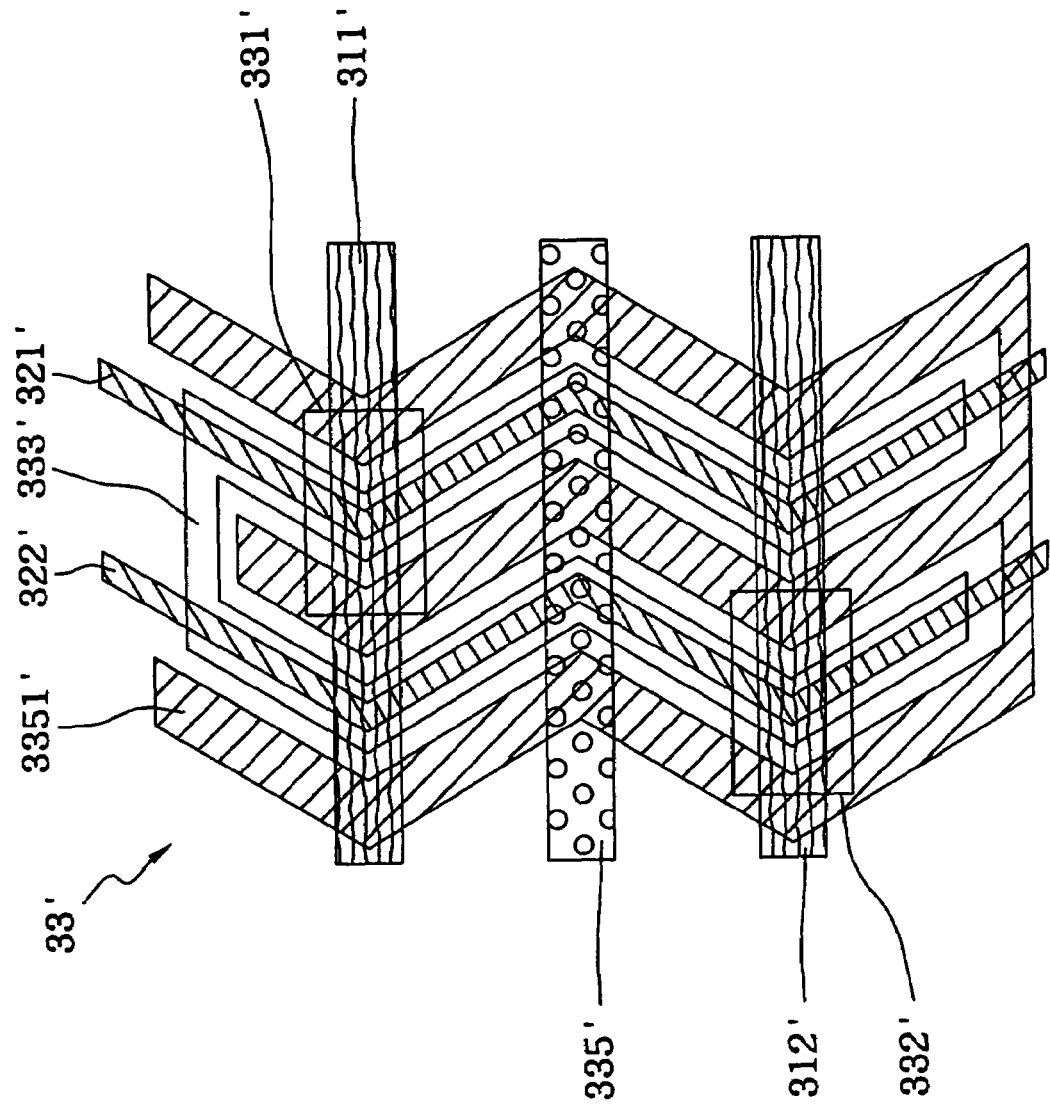
FIG. 8 is a schematic diagram of the circuit layout of the pixel applied to an active matrix substrate employing the Advanced-Super IPS technology in accordance with the present invention.

FIG. 8 is a schematic diagram of the circuit layout of the pixel applied to an active matrix substrate employing the Advanced-Super IPS technology in accordance with the present invention. In this embodiment, a first thin film transistor 331' and a second thin film transistor 332' are disposed at two diagonal corners of a pixel 33', respectively. The first gate electrode of the first thin film transistor 331' is connected to a first scanning line 311', whereas its two other electrodes are connected to a first data line 321' and a pixel electrode 333' respectively. The second gate electrode of the second thin film transistor 332' is connected to a second scanning line 312', whereas its two other electrodes are connected to a second data line 322' and the pixel electrode 333' respectively. A common electrode 335' is electrically connected to its comb-like portion 3351', thus an in-plane electric field exists between the comb-like portion 3351' and the pixel electrode 333' to drive liquid crystal molecules to rotate for an optical response.

The above-described embodiments of the present invention are intended to be illustrative only. Numerous alternative embodiments may be devised by persons skilled in the art without departing from the scope of the following claims.

What is claimed is:

1. A method of driving a pixel unit of a display in which the pixel unit has a first transistor and a second transistor, the method comprising:
    writing a first voltage via a first data line into the first transistor and a pixel electrode during a first period;
    writing a second voltage via a second data line into the second transistor and the pixel electrode during a second period;
    obtaining a first waveform of transmittance from the first voltage returns to a first default, a difference between the first voltage and the second voltage depending on the first waveform; and
    obtaining a first area and a second area enclosed by the first waveform of transmittance and a second waveform of transmittance, a measure of the first area being equal to a measure of the second area.

2. The method of claim 1, the difference between said first voltage and said second voltage being 0 to 0.5 volts.

3. The method of claim 1, further comprising:
    writing a third voltage via the first data line into the first transistor and the pixel electrode during a third period; and
    writing a fourth voltage via the second data line into the second transistor and the pixel electrode during a fourth period.

4. The method of claim 3, further comprising:
    obtaining a third waveform of transmittance resulting from the third voltage returns to a second default during the third period.

5. The method of claim 4, a difference between the third voltage and the fourth voltage being 0 to 0.5 volts.

6. The method of claim 4, wherein the difference between the third voltage and the fourth voltage depends on the third waveform of transmittance.

7. The method of claim 6, which further comprising:
    a third area and a fourth area enclosed by a third waveform of transmittance and a fourth waveform of transmittance, wherein a measure of the third area is equal to a measure of the fourth area.

8. The method of claim 3, wherein a difference between the second voltage and the fourth voltage is 0.5 to 15.5 volts.

9. A driving method for a display in which the display has a first pixel unit and a second pixel unit adjacent to each other, each of the first and second pixel units having a first transistor and a second transistor, the driving method comprising:
    controlling the first transistors of the first and second pixel units and respectively writing a first voltage and a second voltage via a first data line into a first pixel electrode and a second pixel electrode, the first and second pixel electrodes respectively coupled to the first transistors of the first and second pixel units during a first vertical scanning period and a second vertical scanning period; and
    controlling the second transistors of the first and second pixel units and respectively writing a third voltage and a fourth voltage via a second data line into the first and second pixel electrodes during the first vertical scanning period and the second vertical scanning period, each of the first transistors and the second transistors of the first and second pixel units being respectively controlled by different control lines.

10. The driving method of claim 9, wherein the first voltage is different than the third voltage.

11. The driving method of claim 10, wherein the first voltage is larger than the third voltage.

12. The driving method of claim 10, wherein a difference between the first voltage and the third voltage is 0 to 0.5 volts.

13. The driving method of claim 9, wherein the second voltage is different than the fourth voltage.

14. The driving method of claim 13, wherein the second voltage is larger than the fourth voltage.

15. The driving method of claim 13, wherein the difference between the second voltage and the fourth voltage is 0 to 0.5 volts.

16. The driving method of claim 9, wherein the first transistors of the first and second pixel units are controlled by a first driver.

17. The driving method of claim 9, wherein the second transistors of the first and second pixel units are controlled by a second driver.

18. The driving method of claim 9, further comprising:
recovering a first waveform of transmittance resulting from the first voltage to a first default transmittance during the first vertical scanning period.

19. The driving method of claim 18, further comprising:
enclosing a first area and a second area by the first waveform of transmittance and the first default transmittance wherein the measure of the first area is equal to the measure of the second area.

20. The driving method of claim 9, further comprising:
recovering a second waveform of transmittance resulting from the second voltage to a second default transmittance during the second vertical scanning period.

21. The driving method of claim 20, further comprising a step of respectively enclosing a third area and a fourth area by the second waveform of transmittance and the second default transmittance wherein the measure of the third area is equal to the measure of the fourth area.

22. The display of claim 21, wherein the first scanning line and the second scanning line are connected to a first gate driving device.

23. The display of claim 21, wherein the third scanning line and the fourth scanning line are connected to a second gate driving device.

24. The display of claim 21, wherein the first data line is connected to a first data driving device, and the second data line is connected to a second data driving device.

25. The display of claim 21, wherein each of the first and second pixel units further comprises a pixel electrode coupled to the first transistor and the second transistor.

26. The display of claim 21, wherein the second scanning line and the third scanning line are disposed between the pixel electrodes of the first and second pixel units.

27. A display comprising:
a first pixel unit; and
a second pixel unit adjacent to the first pixel unit, each of the first and second pixel units has a first transistor and a second transistor, the first and second transistors being respectively coupled to a first data line and a second data line, each of the first and second transistors having gate electrodes, the gate electrodes of the first transistors of the first pixel unit and the second pixel unit are respectively coupled to a first scanning line and a second scanning line, the gate electrodes of the second transistors of the first pixel unit and the second pixel unit are respectively coupled to a third scanning line and a fourth scanning line, the second scanning line being adjacent to the third scanning line.

* * * * *